Jan. 18, 1927.
F. HAUPT
1,614,955
ILLUMINATED LICENSE PLATE
Filed April 9, 1926
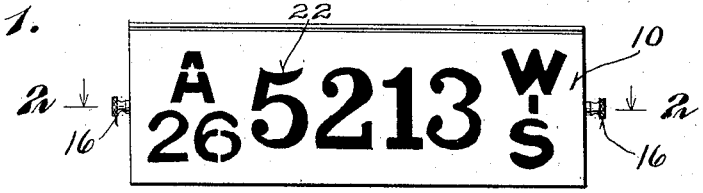
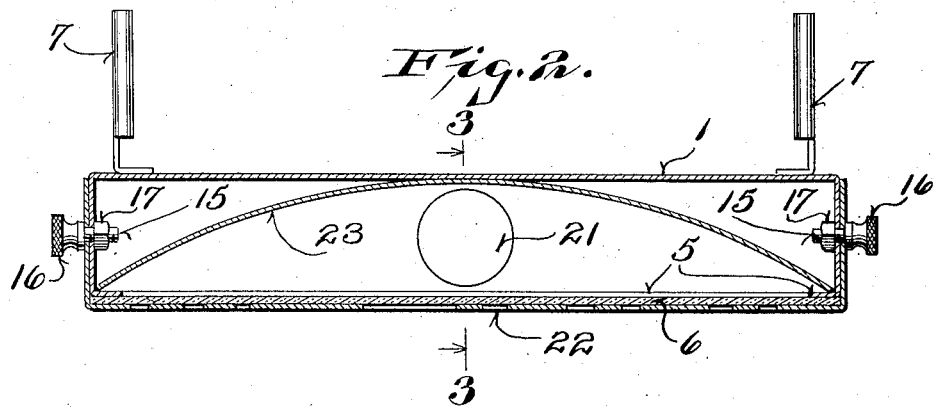
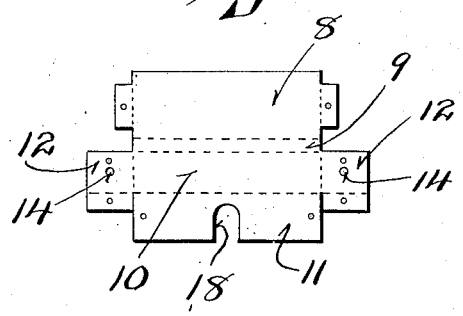
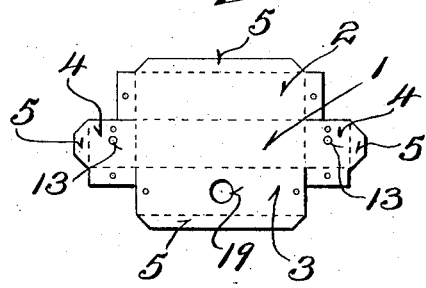
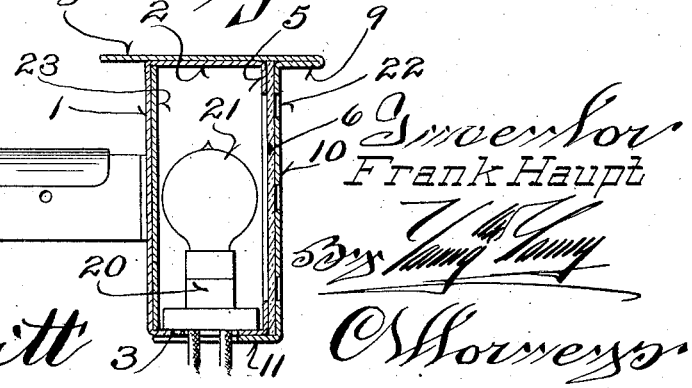
Inventor
Frank Haupt Patented Jan. 18, 1927.

1,614,955

UNITED STATES PATENT OFFICE.

FRANK HAUPT, OF MILWAUKEE, WISCONSIN, ASSIGNOR OF ONE-HALF TO LOUIS SHOOR, OF MILWAUKEE, WISCONSIN.

ILLUMINATED LICENSE PLATE.

Application filed April 9, 1926. Serial No. 100,870.

This invention relates to an illuminated license plate.

License plates as heretofore constructed are not readily visible during the day time, and when illuminated as in the usual manner at night they are scarcely ever visible.

This invention is designed to provide a license plate which is readily visible both at day and at night, which is so constructed that the license plate itself may be directly illuminated from the interior thereof so that the legends appearing on the plate will stand out with distinctness.

When it is considered that the time a license plate is particularly desirable is immediately following an accident when frequently only a brief interval is possible for its reading, it becomes at once apparent that this invention fulfills a long felt want in markedly increasing the visibility of the license plate.

An embodiment of the invention is shown in the accompanying drawings, in which:

Figure 1 is a face view of the plate.

Figure 2 is an enlarged sectional view on the line 2—2 of Figure 1.

Figure 3 is a sectional view on the line 3—3 of Figure 2.

Figure 4 is a blank for the top showing in dotted lines the lines of fold for such blank.

Figure 5 is a blank for the inner portion of the license plate casing, such view also showing the fold lines by means of dotted lines.

Referring to the drawings, it will be seen that the license plate comprises an inner casing member which is provided with a back 1, a top 2 and a bottom 3. It is provided with sides 4. Each of the members thus far described is provided with an inwardly folded marginal flange 5 which is most clearly shown in Figure 5. These marginal flanges are adapted to contact with a glass plate 6 shown in Figures 2 and 3. This glass plate is preferably colored to conform to the general color corresponding to that used for the particular year in which the license is issued. The inner casing is provided with a pair of rearwardly extending members 7 which may be of any suitable form preferably provided with apertures for bolting them in place, and also provided with hook-like upper portions.

The outer casing comprises a top 8 which extends rearwardly beyond the outline of the inner casing, and which extends forwardly. This top is reversely folded as indicated at 9 in Figure 3 to provide an overhanging ledge to protect the front of the plate. It is equipped with a front portion 10, a bottom portion 11 and side portions 12.

It is to be noted particularly from Figures 4 and 5 that the several portions of the device are provided with flaps adapted to be riveted to other portions thereof. For example, the side portions 4 of the inner casing illustrated in Figure 5 are provided with flaps which may be riveted to the bottom 3, and the top portion 2 is provided with flaps which may be riveted to the side portions. A similar construction is followed for the outer casing member as is apparent from an examination of Figure 4.

The end members 4 of the inner casing and the end members 12 of the outer casing are provided with apertures 13 and 14 respectively which are adapted to align and through which attaching screws 15 may be passed as shown in Figure 2, such screws being preferably provided with an outer knurled manipulating handle. Preferably, nuts 17 are soldered or otherwise secured to the inner faces of the ends 4 of the inner casing. The bottom 11 of the outer casing is provided with a cut out 18, and the bottom 3 of the inner casing is provided with an aperture 19 adapted to align with the cut out when the parts are assembled. These openings accommodate the conducting wires wires leading from an electric lamp socket 20—see Figure 3—carried by the inner casing member. This socket removably carries an electric lamp 21.

The front member 10 of the outer casing is cut out to provide the legend as indicated at 22 in Figures 1, 2 and 3 so that the light will shine through these cut outs and indicate the legend with the utmost clearness.

It may be further desirable to provide a reflector such as indicated at 23 in Figures 2 and 3 in order to increase the illumination of the glass plate 6.

It will be seen that a very simple and serviceable type of illuminated license plate has been provided in which an inner and an outer casing are arranged in telescopic relation and are temporarily held together by means of the screws 16. Further, it will be